April 10, 1928.
A. HOLLANDER ET AL
PUMP PACKING MEANS
Filed May 3, 1926
1,665,459
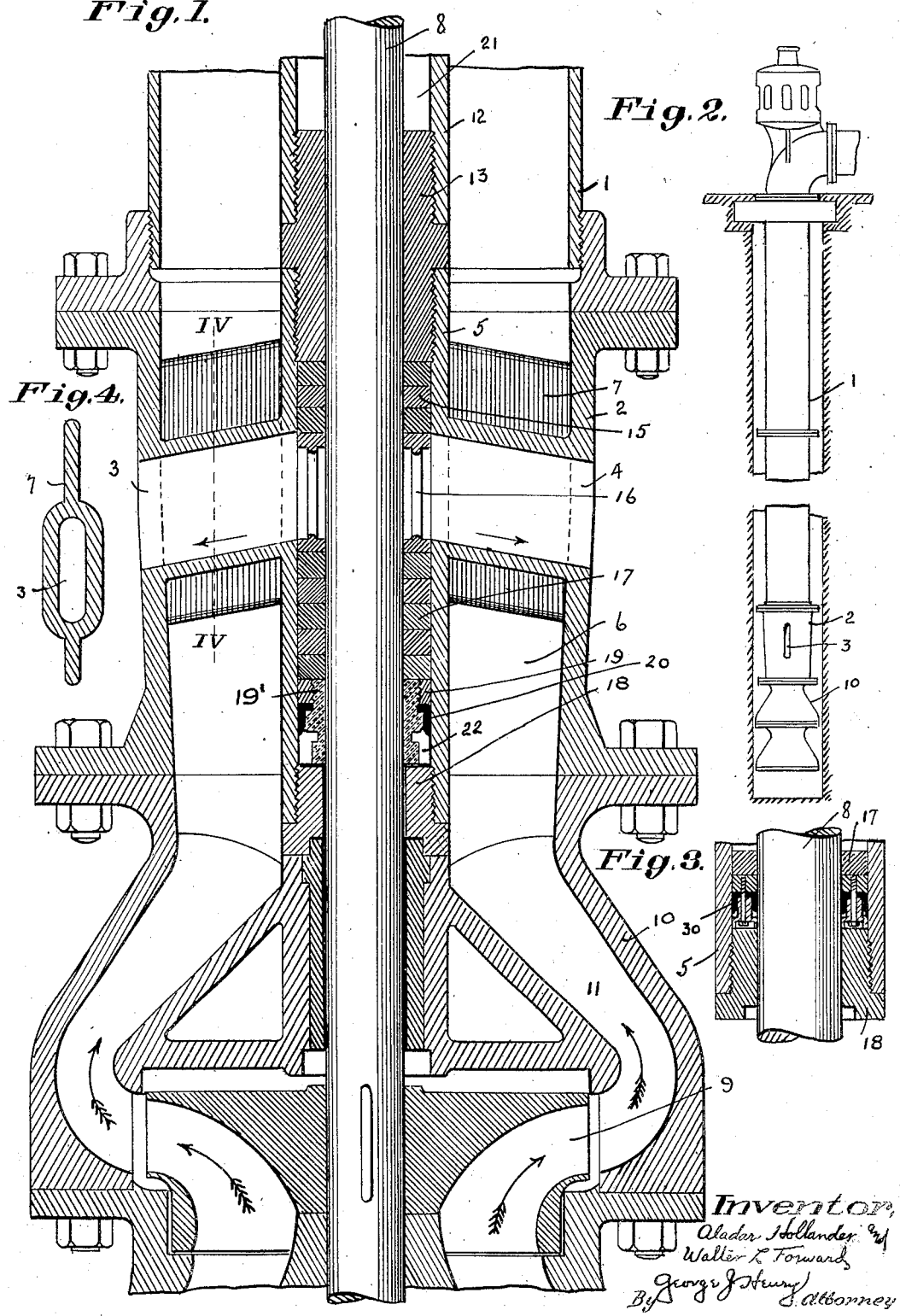

Patented Apr. 10, 1928.

1,665,459

UNITED STATES PATENT OFFICE.

ALADAR HOLLANDER, OF BERKELEY, AND WALTER L. FORWARD, OF OAKLAND, CALIFORNIA, ASSIGNORS TO BYRON JACKSON PUMP MFG. CO., OF BERKELEY, CALIFORNIA, A CORPORATION OF CALIFORNIA.

PUMP-PACKING MEANS.

Application filed May 3, 1926. Serial No. 106,342.

Our invention has for its principal object the maintenance of the efficient lubrication of pumps and especially in deep well pumps.

A further object is in fluid pumps the prevention of pressure water from getting into the bearings or between the shaft and tube shield within which the bearings are located.

A further object is the lubrication of shaft bearings located in a tubular shield within a pump column and the removal of expended or utilized lubricant.

A further object is the automatic maintenance of packing between the lubricating compartment and an outlet and between a pressure chamber and an outlet.

A further object is preventing the leakage of pressure discharge water into the shaft and bearing compartment.

Other objects will appear from the drawing and specifications.

These objects we accomplish by providing around the pump shaft a suitable tubular shield having a discharge duct in its bottom portion and just above the said discharge duct we introduce packing to prevent the excessive loss of oil which would otherwise occur after passing by the bearings. Such oil as has been expended works its way slowly through the packing and is discharged through the said duct. This action was prevented in pumps heretofore by the back pressure from the pumped fluid compartment.

Below the said duct and between the tubular shield and the shaft we introduce a second packing and below this latter packing we prefer to introduce a cup leather or equivalent form of piston against which fluid pressure is admitted. Such water as leaks into or is admitted into the lower end of the shaft tube establishes a pressure against the cup leather and expands the same. The cup leather and its associated parts thus acts as a piston and provides a tight joint and a compression of the packing thereabove. This compression is at all times automatically maintained.

By the combination of the packing and the cup leather as described, the high pressure water which flows or leaks in from the impeller compartment is effectually sealed from rising into the space between the tubular shield and the shaft, and by the first mentioned packing the oil is retained between the tube and the shaft with the bearings properly lubricated at all times.

Because of the discharge duct between the two packings no back pressure can be established against the oil, hence the oil cannot be displaced and perfect lubrication is automatically retained at all times.

In apparatus of this type heretofore the leakage of pressure water upwards between the shield and the shaft has resulted in forcing out the lubricant, except where special lubricating connections and a separate and counter pressure against the lubricant were provided, an expensive and unsatisfactory structure.

By our method a proper lubrication is at all times effected and at the same time pressure water is kept away from the shaft compartment.

Referring to the accompanying drawing by which our invention will be made clear.

Fig. 1 is a fragmentary cross section through the lower end of a vertical shaft high speed centrifugal pump employing our invention.

Fig. 2 is a section through a well employing a pump having the construction of Fig. 1 at its lower end.

Fig. 3 is a fragmentary cross section of an alternate form of cup leather packing.

Fig. 4 is a cross section on the line IV—IV of Fig. 1.

Throughout the figures similar numerals refer to identical parts.

The numeral 1 indicates a pump casing, on the lower end of which we prefer to introduce a casting having ducts 3, 4 extending from the tubular portion 5 through the water channel 6, and therefore sealed from pressure water and free to discharge any pressure fluid and any lubricant that leaks by the packings.

These ducts are preferably formed in the ribs one of which is shown at 7 (see Fig. 4).

At 8 is a main pump shaft and at 9 an impeller fixed on the said shaft.

The impeller rotates in the impeller compartment 10, having the guide channel 11 for delivering discharge water from the impeller 9 and into the pump column 6.

The tubular shield for the shaft is indicated at 12 and has its extended portion formed by the casting 5 and therebetween is mounted a bearing 13 of which there are usually a plurality arranged between the shaft 8 and the tube 12, in spaced relation and to take care of the proper supporting of the long shaft ordinarily employed in apparatus of this character.

Below the bearing 14 is the oil packing 15 held in place by the cage 16 and therebelow a second set of packing rings 17 which in turn are held in place by the element 18, cup leather 20, and ring member 19 threaded to the collar 19' and thereby gripping the leather 20 and forming collectively piston means.

This gland in effect clamps all of the parts between the lower end of the tube 5 and bearing 13. The element 18 holds in place the cup leather piston and which under the action of fluid pressure from below seals against the inner portion of the tube 5, the element 18 being threaded into the said tube to hold the parts in position at such times as no fluid pressure is exerted upward against the piston 20, as when the parts are assembled and shipped and before putting in use.

It will now be seen that lubricant which is freely supplied from the top of the pump and which flows down through the bearing compartment 21 is held in place by the packing material 15 and any leakage through the said packing flows freely out through the ducts 3 or 4, there being no possible back pressure against the lubricant column, due to fluid pressures of the pump.

On the other hand fluid pressure leaking or passing from the passages 11 around the shaft 8 and element 18 is stopped by the packing material 17 which bears tightly against the column shaft 8 and is held compressed thereagainst by the piston 20.

Leakage along the outside of the packing 17 and between it and the tube 5 is prevented or reduced to a minimum by the cup leather 20.

The degree of compression in the packings 15 and 17 is automatically controlled and determined by the discharge pressure of the pump exerted against the piston 20 and by said piston against the said packings, and this pressure is automatically attained being higher or lower respectively as the pump is employed on higher or lower discharge pressures.

Any excess leakage of pressure fluid by the packing 17 and any excess oil escaping by the packing 15 is discharged through the ducts 3, 4.

The pressure water leaking into the space 22 seals the cup leather 20 against the inner surface of the tube 5.

In the alternate construction shown in Fig. 3 the cup leather 30 seals against the shaft 8 as well as against the tube 5 and in such case the packing 17 may be reduced or dispensed with.

The small leakage that does occur by the cup leather 20 and packing 17 passes out through the ducts 3 or 4 as does also the expended lubricant which may seep down through the packing at 15.

It will now be seen that no back pressure can occur against the lubricant or in the lubricating compartment, that the high pressure water is sealed against getting into the lubricating compartment and that all parts are automatically retained in proper lubricated condition during operation.

Although we have shown our invention as applied to a deep well centrifugal pump for which type of apparatus it is particularly advantageous, it may also be employed in horizontal and other forms of fluid pressure apparatus as hydraulic turbines and the like and we wish to be understood as claiming all such.

We claim:

1. Means for maintaining the lubrication of fluid pumps having impeller shaft and bearing means, and comprising a tubular shield surrounding and spaced from said shaft, said bearing means positioned between said shield and said shaft, a discharge duct from said shield adapted to discharge excess fluid or excess lubricant from the space between the shaft and the shield, packing means between the duct and the bearing means and other packing means between the duct and the impeller means, said first named packing means adapted to restrain the escape of lubricant through the duct and said other packing means adapted to restrain the escape of pressure fluid through the duct, and a piston adapted to automatically compress both packings simultaneously and actuated by discharge pressure of said pump, and a spacing cage between said packing and said other packing.

2. In a deep well pump, a well casing, a shaft in said casing, a tubular shield around said shaft and providing a channel for discharged water between the shield and the casing, impeller means on the lower end of said shaft, a duct across said channel adapted to discharge to the exterior of the casing and having an inlet port into the tubular shield, packing material between the shaft and the shield above said inlet port, a piston means between said port and said impeller means and between said shield and said shaft and a passage adapted to communicate pressure fluid from the pump discharge against the piston means to compress said packing.

3. In a deep well pump, a well casing, a shaft in said casing, a tubular shield around said shaft and providing a channel for discharged water between the shield and the casing, impeller means on the lower end of said shaft, a duct across said channel adapted to discharge to the exterior of the casing and having an inlet port into the tubular shield, a cage between the shaft and the shield opposite said port, packing material above and other packing material below said cage, and a cup leather piston between said port and said impeller means and between said shield and said shaft which seals pressure fluid from passing upward between the shaft and the shield.

4. Means for maintaining the lubrication of a deep well vertical shaft pump having shaft bearings, comprising a tubular shield around and spaced from the shaft, packing material below the bearings, a discharge duct from said tubular shield below the packing material, other packing material below said discharge duct and sealing the space between the shaft and the shield from ingress of pressure fluid, and comprising a piston below said last named packing adapted to compress said packing and said cage and a passage adapted to communicate pressure fluid from the pump discharge against the piston to compress said packing.

ALADAR HOLLANDER.
WALTER L. FORWARD.